United States Patent
Mayr

(10) Patent No.: US 10,189,521 B2
(45) Date of Patent: Jan. 29, 2019

(54) ASSEMBLY PLATFORM

(71) Applicant: KUKA Systems GmbH, Augsburg (DE)

(72) Inventor: Stefan Mayr, Friedberg (DE)

(73) Assignee: KUKA Systems GmbH, Augsburg (DE)

( * ) Notice: Subject to any disclaimer, the term of this patent is extended or adjusted under 35 U.S.C. 154(b) by 0 days.

(21) Appl. No.: 15/567,102

(22) PCT Filed: Apr. 14, 2016

(86) PCT No.: PCT/EP2016/058251
§ 371 (c)(1),
(2) Date: Oct. 17, 2017

(87) PCT Pub. No.: WO2016/166231
PCT Pub. Date: Oct. 20, 2016

(65) Prior Publication Data
US 2018/0093728 A1  Apr. 5, 2018

(30) Foreign Application Priority Data
Apr. 17, 2015  (DE) .................. 10 2015 206 983

(51) Int. Cl.
*B65G 47/22* (2006.01)
*B62D 65/18* (2006.01)

(52) U.S. Cl.
CPC .................. *B62D 65/18* (2013.01)

(58) Field of Classification Search
CPC ... B62D 65/022; B62D 65/026; B62D 65/028
USPC ................... 198/345.1, 345.3, 346
See application file for complete search history.

(56) References Cited

U.S. PATENT DOCUMENTS

| 3,459,313 | A | * | 8/1969 | Brummel | ............... F27D 3/0024 |
| | | | | | 134/157 |
| 5,984,085 | A | * | 11/1999 | Ponzio | .................... H02K 15/00 |
| | | | | | 198/345.3 |
| 6,324,749 | B1 | * | 12/2001 | Katsuura | ............... B23P 21/004 |
| | | | | | 29/402.01 |

(Continued)

FOREIGN PATENT DOCUMENTS

| DE | 69107828 T2 | 11/1995 |
| DE | 102012213583 A1 | 2/2013 |

(Continued)

OTHER PUBLICATIONS

European Patent Office; Search Report and Written Opinion in International Patent Application No. PCT/EP2016/058251 dated Jul. 14, 2017; 13 pages.

*Primary Examiner* — Douglas A Hess
(74) *Attorney, Agent, or Firm* — Dorton & Willis, LLP

(57) ABSTRACT

A flow production system, in particular an assembly and/or production line includes a conveyor for conveying a workpiece along a conveying direction of the flow production system. A platform for use in flow production includes a guiding device and a processing device, wherein the platform is designed to be moved into and out of the flow production substantially as a whole. A method for operating a flow production system or a platform includes guiding a workpiece along the platform with the guiding device and processing the workpiece with the processing device during guiding.

21 Claims, 2 Drawing Sheets

(56) References Cited

U.S. PATENT DOCUMENTS

| | | | | |
|---|---|---|---|---|
| 6,966,427 | B2* | 11/2005 | Kilibarda | B65G 17/002 |
| | | | | 198/465.4 |
| 7,484,616 | B2* | 2/2009 | Nakamura | B61B 10/02 |
| | | | | 104/172.2 |
| 7,628,264 | B2* | 12/2009 | Ehlert | B23Q 17/003 |
| | | | | 198/341.01 |
| 8,157,079 | B2* | 4/2012 | Assmann | B62D 65/18 |
| | | | | 198/345.1 |
| 8,230,988 | B2* | 7/2012 | Tada | B62D 65/18 |
| | | | | 198/346.2 |
| 9,352,913 | B2* | 5/2016 | Manuszak | B65G 15/14 |
| 9,586,297 | B2* | 3/2017 | Kozasa | B65G 37/00 |
| 9,862,550 | B2* | 1/2018 | Yeum | B65G 43/08 |
| 9,873,569 | B1* | 1/2018 | Frohlich | B65G 41/007 |
| 2011/0265301 | A1 | 11/2011 | Kilibarda | |

FOREIGN PATENT DOCUMENTS

| | | |
|---|---|---|
| DE | 102013021388 A1 | 7/2014 |
| JP | S608171 A | 1/1985 |
| JP | S61146439 A | 7/1986 |

* cited by examiner

ASSEMBLY PLATFORM

CROSS-REFERENCE

This application is a national phase application under 35 U.S.C. § 371 of International Patent Application No. PCT/EP2016/058251, filed Apr. 14, 2016, (pending), which claims the benefit of German Patent Application No. DE 10 2015 206 983.4 filed Apr. 17, 2015, the disclosures of which are incorporated by reference herein in their entirety.

TECHNICAL FIELD

The present invention relates to a flow production system, in particular of an assembly and/or production line. The present invention further relates to a platform for use in such a flow production.

BACKGROUND

In a series or flow production, workpieces are typically transported through individual stations in succession, wherein the workpiece is subjected to a variety of work processes in these stations. In particular in automotive construction, vehicle bodies are transported through a large number of processing stations, in which a variety of processes, such as a welding process for example, are carried out. The workpieces are usually conveyed continuously through production or assembly, whereby the workpieces are frequently processed in a flow operation, i.e. as they are being transported.

In automotive construction, the vehicle bodies are often conveyed through production or assembly in a suspended manner in so-called c-shaped hangers, while being processed, for example, by fitters. At present, there is a low degree of automation in this type of production or assembly line, and a majority of the work is performed manually by workers or fitters. The advantage of this is that this type of manual activity can be accomplished with very high availability and the worker can apply his problem-solving logic, something that an automation system typically does not possess. A relatively high throughput can thus be kept largely constant.

Even though the use of manipulators or robots in such systems increases the accuracy and precision of the work to be performed, there are also disadvantages: On the one hand, the configuration is costly and the manipulators in the respective work station have to be calibrated. The use of manipulators in a flow production is therefore in particularly difficult in terms of their flexibility with respect to position and the work they are expected to perform. Since, in particular in automotive construction, the exact position of the individual bodies in a work station can vary, to make precise work of the manipulator possible, the exact position of the workpieces during operation must be determined as well. In addition, the use of manipulators increases the risk of injury to people, in particular when the manipulator is not (or only conditionally) suitable for use in a human-robot collaboration (HRC) environment. Finally, any occurring fault, such as an overload of a manipulator, usually triggers an emergency stop function. As a result the flow production is interrupted, which ultimately has a negative effect on throughput and revenue.

It is therefore an object of the present invention to make possible a flexible and easy implementation of manipulators in flow productions. The object is, in particular, to make an easy interchangeability of manipulators and/or work stations possible. The present invention is furthermore based on the object to provide a safe work station, in particular for flow production, with which possible interruptions in flow production are reduced.

This and other objects, which will become apparent when reading the following description, are achieved with a flow production system as described herein.

SUMMARY

The invention relates to a flow production system, in particular of an assembly and/or production line. Depending on the configuration, an assembly or production line can comprise other systems in addition to the flow production system. The invention therefore relates to a system that can be used for a flow production, such as in body shell construction, assembly or in a production, for example. The flow production system is particularly preferably suitable for automotive construction. The person skilled in the art will understand that the flow production system of the present invention can include different work stations, corresponding to the respective use. The term "flow production" here also includes so-called clocked production.

The inventive flow production system comprises a conveyor for conveying a workpiece, preferably along a conveying direction of the flow production system. The person skilled in the art will understand that a workpiece is typically transported through a variety of work stations of a flow production by means of the conveyor. In automotive construction, for example, the conveyor can therefore comprise a c-shaped hanger for holding a vehicle body and a corresponding transport device for transporting the c-shaped hanger.

The inventive flow production system further comprises a platform, which is designed to be moved into and out of the flow production system substantially as a whole. The platform is thus not an integral component of the flow production system, but can instead be moved into and out of the flow production as needed. Consequently, the platform is transportable and can thus also be used in a positionally flexible manner in one or in a variety of flow production systems. In addition to the platform, the flow production system can also comprise other work stations and/or platforms. The "platform" can be designed in a variety of different forms; for example, it can comprise a flat stage with a framework or a carrier frame to carry different elements or components.

The platform comprises a guiding device, which is configured to guide the conveyed workpiece along the platform and to discontinue the guidance at any time. The workpiece is conveyed along the platform by means of the conveyor of the flow production system, and is guided or also directed along said platform by means of the guiding device. The guiding device is configured in such a way that this guidance of the workpiece can be discontinued at any time, so that the workpiece can be conveyed further without guidance (in or on the platform) by means of the conveyor.

The platform of the flow production system further comprises a processing device, which is configured to process the conveyed workpiece while the conveyed workpiece is being guided by means of the guiding device. A corresponding work process of the flow production is carried out via the processing direction. The platform is preferably stationary while the workpiece is being guided and processed.

The inventive flow production system thus comprises a platform, which can advantageously be moved into and out of the flow production system as a complete cell. Since the platform comprises a guiding device for guiding the conveyed workpiece, it is possible to precisely define the position of the workpiece in the platform based on the associated guiding accuracy, which in turn allows a precise processing of the workpiece by the processing device. In addition, when a fault occurs, the guidance can be discontinued at any time, so that the conveyor of the flow production system can convey the workpiece further without hindrance. It is therefore not absolutely necessary to switch off the conveyor when such a fault occurs. As a result, the output of the flow production system is increased.

Since the components on the platform can be precisely measured, the processing device has to be configured only once relative to the guiding device, for example, so that a corresponding control of the processing device knows the precise transformation between the processing device and the guiding device. Since the position of the workpiece to be processed can be defined by the guiding device, a precise processing of the workpiece can consequently be made possible without complex calibration of the processing device. If the use of the platform is changed, i.e. the platform is moved into another location of the production system to perform a different process, for example, only the processing program of the processing device has to be updated—a reconfiguration or remeasurement of the platform is not necessary.

The inventive flow production system preferably also comprises a control device which is configured to detect a fault. The control device is further configured, in response to the detection of a fault, to prompt the guiding device of the platform to discontinue the guidance. The person skilled in the art will understand that the control device can preferably be connected to corresponding sensors, which can preferably be provided in the flow production system (such as, for example, on the platform). If a fault is detected, the control device can emit relevant control signals, which cause the guiding device to discontinue the guidance. The control device is furthermore preferably disposed on the platform. Said control device can be provided in a control box or the like, for example, and can also be provided, for example, in combination with a manipulator controller.

In particular, if a fault is detected, the guidance of a workpiece currently being conveyed along the platform (as well as all the following conveyed workpieces) can be suspended, so that the workpieces can be conveyed unhindered along the platform by means of the conveyor. The conveyed workpiece cannot be conveyed along the platform by means of the guiding device and processed again until the fault has been rectified. The workpiece that has not been completely processed must, of course, be reworked and finished in a later step.

The fault can occur as the result of a variety of factors. It can be the result of incorrect guiding of the workpiece along the platform, for example, or even an error of the processing device (such as a manipulator overload error). A detection of a person in the immediate vicinity of the platform can also trigger such a fault. The platform is therefore also suitable for safe use in an HRC environment.

The platform of the flow production system preferably further comprises means for moving the platform, whereby said means are configured to move the platform in and out. These means preferably allow the platform to be moved in and out easily and quickly, whereby the means for moving the platform particularly preferably comprise rollers and/or air cushions. Alternatively or additionally, the platform can also comprise corresponding slots and/or reinforcements, which allow the platform to be picked up by a forklift or indoor crane. Since the platform can preferably be moved easily and quickly into the flow production system as a complete cell, or also removed again quickly in the event of a fault, the response to faults can be flexible, and an efficient exchange of individual work stations can be made possible.

The processing device of the platform preferably comprises a manipulator, such as a multiaxial jointed-arm robot, for example. Particularly preferably, the platform can, depending on what is needed, comprise a plurality of manipulators. The platform furthermore preferably comprises a linear unit for the purpose of moving one or more manipulators. Said linear unit can move a manipulator in accordance with the work process to be performed. The linear unit can be configured to move the manipulator along a guiding direction of the guiding device, for example, or also along the conveying direction of the flow production system. In particular, the manipulator is preferably moved at the same velocity as the conveyed workpiece, so that there is advantageously no relative velocity between the manipulator and the conveyed workpiece. The manipulator can therefore process the workpiece without the use of complex velocity transformations. After the workpiece has been processed or after the workpiece has left the platform, the linear unit preferably moves the manipulator back to the starting point. Depending on the configuration, a plurality of linear units can be provided, each of which moves one or more manipulators.

The processing device of the platform is furthermore preferably configured to discontinue the processing of the workpiece, in response to a discontinuation of the guidance. Therefore, if a guidance is discontinued, for example if a fault occurs, the processing of the workpiece by the processing device is discontinued as well. The workpiece can thus be conveyed further without hindrance by means of the conveyor of the flow production system, without the need to delay the operation. For example, a jointed-arm robot can change its configuration to retract its end effector. Particularly preferably, a tilt foot can be provided on which, for example, a jointed-arm robot is disposed. To discontinue the processing, the tilt foot can tilt, as a result of which the jointed-arm robot is removed from the workpiece. The person skilled in the art will understand that a jointed-arm robot can also be moved, operated or folded in other ways to be removed from the workpiece. By actively removing the jointed-arm robot, the workpiece is protected from any damage that could occur. Means are additionally preferably mounted on the platform, which identify whether this retraction possibility is available for the manipulator, or is blocked, for example by a fitter.

The platform of the flow production system preferably further comprises means for detecting a conveying velocity of the conveyor and/or means for detecting a position of a workpiece relative to the platform. The detected conveying velocity can preferably be taken into account by the processing device to process the workpiece. Since the platform can independently detect the conveying velocity, it can be used as a universal platform in the flow production system, because it does not require (or only little) external information. The detection of the position of a workpiece relative to the platform can also be taken into account by the processing device for processing the workpiece, because the start of a processing procedure, for example, can be initiated thereby.

The means for detecting the velocity of the conveyor and/or the means for detecting the position of the workpiece are preferably provided on the guiding device. The velocity of the conveyor can preferably be detected directly, and/or the position of the guided and conveyed workpiece can be detected, when guiding the conveyed workpiece. A precise and reliable processing of the workpiece in the platform is thus achievable.

The guiding device of the platform preferably comprises at least one guide rail, and particularly preferably two guide rails, which are movably arranged between a first position and a second position. The guide rails are particularly preferably movable relative to one another. In the first position, the guide rails effect a guiding of the conveyed workpiece along the platform, and, in the second position, a discontinuation of the guidance. The use of two rails allows precise guiding of the workpiece along the platform, as a result of which the lateral position of the workpiece is precisely defined. The person skilled in the art will understand that the guiding device can also comprise more than two guide rails, as a result of which a guiding of large and bulky workpieces, for example, can be controlled more precisely.

The guide rails are preferably arranged closer to one another in the first position than in the second position, so that the guiding of the workpiece is made possible by a type of clamping of the workpiece by the two guide rails without blocking the conveying of the workpiece. The two guide rails are preferably further apart in the second position, so that direct contact of the workpiece with the guide rails is preferably no longer provided. As a result there is no active guidance. The first and second positions preferably differ in that the guide rails are in a respective first and second vertical position. To discontinue the guidance the guide rails move into the second position, as a result of which the workpiece is released. To discontinue the guidance, the guide rails preferably move laterally away from one another and/or downwards. It is furthermore possible that, even though the guide rails are disposed closer to one another in the second position, in their path from the first position to the second position they assume an intermediate position in which they are spaced further apart from one another, and likewise preferably move downwards/upwards away from the workpiece to be processed, thus executing a type of circular or elliptical movement to move from the first position into the second position.

Similarly, in the case of at least one guide rail, in particular in the case of only one guide rail, the weight of the workpiece and/or the guiding device can be used for positioning by preferably disposing the guide rail in such a way that the workpiece and/or the guiding device can run along the guide rail as a result of its own weight. In doing so it touches the guide rail, thus defining an exact position. The guide rail preferably directs the workpiece and/or the guiding device out of the bottom dead point, thus lifting it slightly.

The guiding of the workpiece particularly preferably occurs by means of contact of the guide rails with a part of the conveyor and/or a part of the workpiece. By means of this contact, the workpiece can be guided or directed efficiently along the platform, whereby the forward movement of the workpiece is primarily provided by the conveyor.

The guide rails preferably comprise rollers, belts (such as a belt strap, for example) and/or balls, which, in the first position, are in contact with a part of the conveyor and/or a part of the workpiece. These means allow the conveyor or the workpiece to be directed along the guide rails substantially without friction and guided precisely along the platform by the guide rails.

The guiding device preferably comprises at least one carrier, moreover in particular a mandrel, which can be moved at least linearly in a conveying direction of the flow production system. This carrier or mandrel can interact with a part of the conveyor and/or a part of the workpiece and thus facilitate the guidance. To be able to discontinue the guidance at any time, the carrier can preferably be retracted, so that there is or can no longer be any contact with a part of the conveyor and/or a part of the workpiece. When such a carrier is used, the lateral position of the workpiece is preferably not changed, but rather only detected. The processing device can thus precisely process the workpiece while taking into account the detected lateral position of said workpiece. A slide rail is preferably used as well, which can be disposed on a part of the conveyor or on a part of the workpiece, for example, and interacts with the carrier. The slide rail can alternatively also be disposed on the platform.

A slide rail can particularly preferably be provided on the conveyor, which can interact with the guiding device, so that it can absorb vibrations and dissipate them, for example, into the platform. Vibrations caused by the conveyor can thus be reduced, and joining forces caused by the processing devices can be absorbed as well. Damping devices, which prevent lateral vibrations of the guided workpiece and thus stabilize the workpiece relative to the processing device, can preferably be provided on the conveyor.

The present invention further relates to a platform for use in a flow production, and in particular of an assembly and/or production line, in which flow production a workpiece is conveyed along a conveying direction. The platform comprises a guiding device, which is configured to guide the conveyed workpiece along the platform and to discontinue the guidance at any time. The platform further comprises a processing device, which is configured to process the conveyed workpiece while the conveyed workpiece is being guided by means of the guiding device. The platform is designed to be moved into and out of the flow production substantially as a whole. In order to be usable as a universal platform in flow production, the platform preferably provides all the important technical elements. In the event of an error, a workpiece can be released quickly and efficiently, so that said workpiece can be conveyed further in the flow production.

The platform preferably further comprises means for moving the platform, which are configured to move the platform in and out, wherein the means for moving preferably further comprise rollers and/or air cushions. The processing device preferably comprises at least one manipulator, and the platform further preferably comprises a linear unit for moving the at least one manipulator. The processing device of the platform is preferably further configured to discontinue the processing of the workpiece in response to a discontinuation of the guidance.

The person skilled in the art will understand that the inventive platform can preferably correspond to the platform of the inventive flow production system, and that the features and advantages described in that context also apply to the inventive platform.

The present invention further relates to a method for operating a flow production system described above, and in particular for operating a platform described above. The method comprises a guidance of a conveyed workpiece along the platform by means of the guiding device, and a processing of the workpiece by means of the processing device while it is being guided. This represents normal operation, so to speak, in which the conveyed workpiece is guided and at the same time preferably aligned, so that it can be processed precisely.

The method further comprises a discontinuation of the guidance and/or discontinuation of the processing in response to the detection of a fault. Therefore, in the event of a fault, the guidance is discontinued and the workpiece is released, and/or the processing of the workpiece is discontinued, so that the workpiece can be conveyed further in the flow production without hindrance.

The processing of the workpiece preferably comprises screwing, welding, riveting, adhesive bonding and/or inserting a plug.

BRIEF DESCRIPTION OF THE DRAWINGS

The present invention is described in more detail in the following, with reference to the accompanying figures. Similar elements are provided with the same reference numbers.

DETAILED DESCRIPTION

Figure 1:
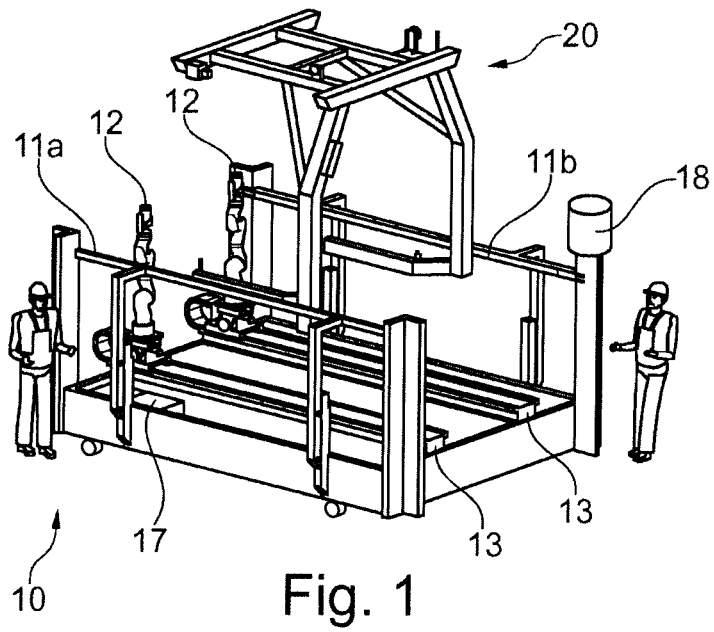
FIG. 1 is a schematic illustration of an exemplary embodiment of an inventive flow production system in accordance with the principles of the present disclosure.

FIG. 1 shows a flow production system, or rather a part of a flow production system. A platform 10 and a c-shaped hanger 20 (part of a conveyor), which is conveyed by the platform, can be seen. Additional processing systems, which accordingly process a workpiece (not shown) being conveyed by the c-shaped hanger, can be provided in front of and behind the platform (10). The platform 10 is designed to be transportable and flexible in term of positioning: It can be moved as a whole, so that it can, for example, be used at another location of the flow production system.

The depicted platform 10 comprises two guide rails 11a, 11b, which are in contact with the c-shaped hanger 20, and thus guide said c-shaped hanger through the platform 10. Since the lateral deflection, or rather position, of the c-shaped hanger 20 can vary by about 20 mm, for example, the position of the c-shaped hanger 20 relative to the platform is precisely defined by said guide. The guide rails 11a, 11b can be shaped in such a way that they permit a simple insertion of the c-shaped hanger 20 into the guide.

The platform 10 further comprises two manipulators which are designed as multiaxial jointed-arm robots 12. The jointed-arm robots 12 are respectively provided on one linear axis 13, which makes a separate or a simultaneous movement of the jointed-arm robots 12 along the platform 10 possible. To process a respective workpiece while it is being conveyed and guided by the platform 10, the jointed-arm robots 12 and the conveyed c-shaped hanger 20 can be moved together by means of the linear axes 13. To discontinue the guidance, a control device 17, which can detect faults, is further configured on the platform. Means 18 (e.g. suitable sensors) for detecting the conveying velocity of the conveyor are provided on the guiding device of the embodiment of FIG. 1 as well. These means 18 can also serve to detect the position of the workpiece relative to the platform 10.

Velocity sensors (not shown), which allow the velocity of the c-shaped hanger 20 to be determined, are additionally disposed in the guide rails 11a, 11b. For this purpose, velocity values can be picked up along the entire length, for example by means of a roller via a secure transmitter.

Figure 2:
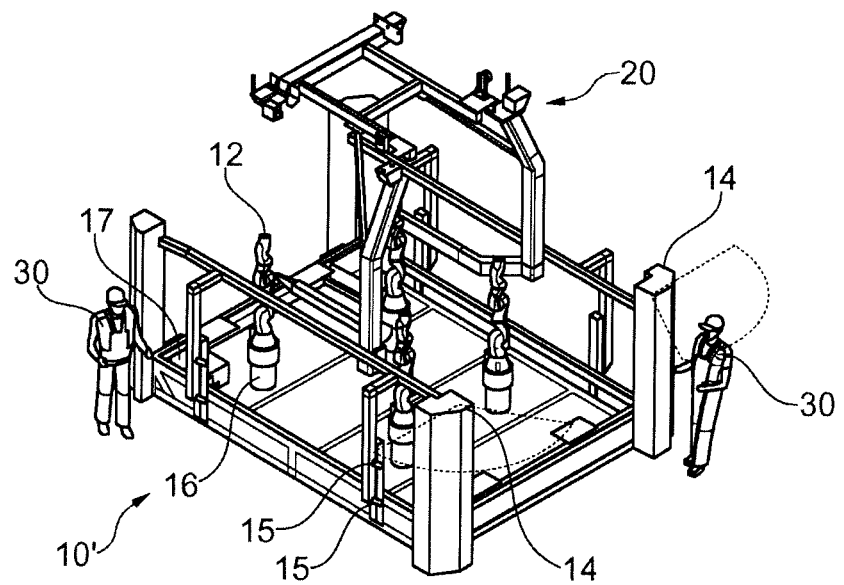
FIG. 2 is a schematic illustration of another exemplary embodiment of an inventive flow production system in accordance with the principles of the present disclosure.

FIG. 2 additionally shows two sensors 14, which monitor the surroundings of the platform 10. If a fitter 30 approaches the platform 10 and comes within a predefined first distance, for example, an interference signal can be triggered, which causes the platform 10 to fold the guide rails 11a, 11b outwards and down. This takes place by means of the depicted double joints 15, which allow the guide rails 11a, 11b to retract when they fold, so that the c-shaped hanger 20 is ultimately released and can be conveyed unhindered through the platform 10. If he comes within a predefined second distance, a second interference signal can be triggered, which causes an emergency stop of the conveyor, as a result of which the c-shaped hanger 20 is stopped. An impending injury of a worker 30 can thus be prevented.

The four jointed-arm robots 12 in FIG. 2 are respectively provided on retracting feet 16, which enable a quick and safe downward retraction of the jointed-arm robots 12. The jointed-arm robots 12 can thus be retracted in the event of a malfunction, so that damage to the workpiece can be avoided.

Figure 3:
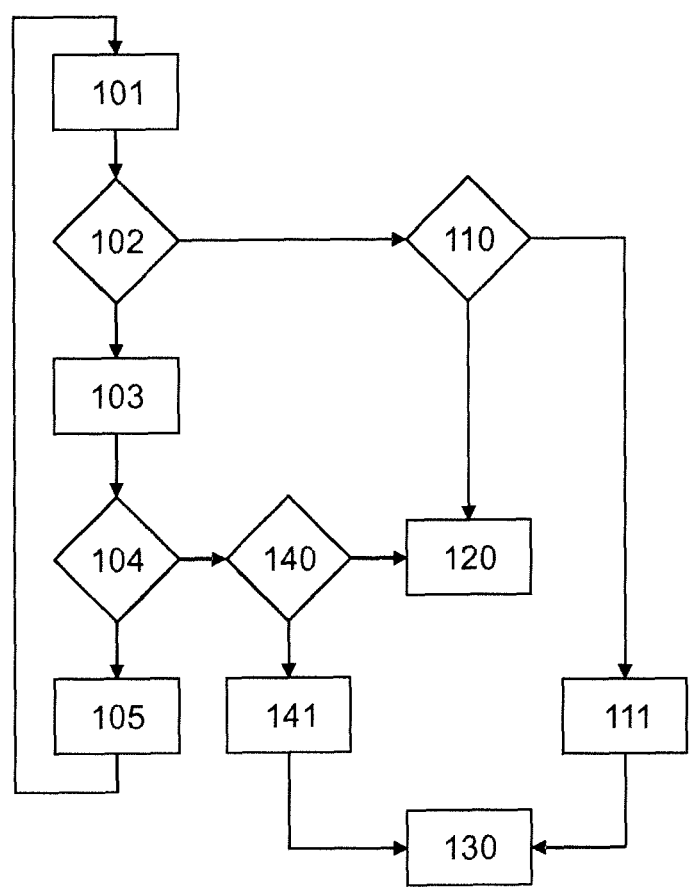
FIG. 3 is a flow chart of an inventive method in accordance with the principles of the present disclosure.

FIG. 3 shows a flow chart of an exemplary method 100 for operating a platform according to an embodiment of the present invention. The method is described in the following description, with reference to the components depicted in FIGS. 1 and 2. However, the method is not intended to be limited thereto.

The method begins in step 101, in which a c-shaped carrier 20 is inserted into the guide rails 11a, 11b along with the workpiece, so that it is subsequently conveyed through the platform 10 in a guided manner. In the following decision 102, during the guidance of the c-shaped carrier 20, there is a test to see if there is a fault. This fault can be the result of an incorrect insertion of the c-shaped carrier 20 into the guide rails 11a, 11b, or an approach of a fitter 30 to the platform 10 or the like.

If the decision 102 is negative, i.e. there is no error, the processing procedure is started by the manipulators 12 in the following step 103. In the following decision 104, during the processing, there is a test to see if there is a fault. In addition to the abovementioned situations, the fault can also be the result of a malfunction or an overload error of a manipulator 12, for example.

If the decision 104 is negative, i.e. there is no error, the c-shaped carrier 20 is moved out of the guide rails 11a, 11b in the following step 105 after termination of the processing and, if necessary, the manipulators 12 move back into their original position. The method can subsequently be repeated by inserting a new c-shaped carrier 20 in accordance with step 101.

If a fault has been detected in the decisions 102 and 104, a respective subsequent decision 110, 140 checks to see whether the fault is serious, i.e. exceeds a predefined limit value. Such a serious fault can, for example, be the direct entrance of a worker 30 into the platform 10, as a result of which there is acute risk to the life of the worker 30. If such a serious fault is detected in the decisions 110, 140, a hanger emergency stop function is activated in step 120, as a result of which the flow production (and also the processes of the platform 10) come to a standstill.

If the decision 110 determined that the fault detected in the decision 102 is not serious, the guidance is discontinued in the following step 111. To do this, the guide rails 11a, 11b are folded outwards and down, so that there is no longer contact between the guide rails 11a, 11b and the c-shaped hanger 20. In the following step 130, therefore, the c-shaped hanger 20 can be transported or conveyed further through the platform 10 without hindrance. The guide rails 11a, 11b remain in the folded-away state, and an error message is emitted, which advises of the outage of the platform 10. All following C-shaped hangers 20 are conveyed unhindered through the platform 10.

If the decision 140 determined that the fault detected in the decision 104 is not serious, the guidance and the processing by the manipulators 12 is discontinued in the following step 141. To do this, the guide rails 11a, 11b are folded away as described above in step 111, and the manipulators 12 continue to move into a specific position or configuration, so that the c-shaped hanger 20 along with the workpiece can be transported through the platform without hindrance in the following step 130. To do this, the manipulators 12 are also retracted from the workpiece by means of the retracting feet 16. As already described, all following C-shaped hangers 20 are now conveyed unhindered through the platform 10.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMBERS 10 platform
11a, 11b guide rails
12 jointed-arm robot
13 linear axes
14 sensors
15 double joints
16 retracting feet
17 control device
18 means for detecting the conveying speed or position of the workpiece
20 c-shaped hanger (part of the conveyor)
30 worker

What is claimed is:

1. A flow production system for use in an assembly line or production line, the flow production system comprising:
a conveyor for conveying a workpiece along a conveying direction of the flow production system; and
a platform configured to be moved into and out of the flow production system substantially as a whole, the platform comprising:
a guiding device configured to guide the conveyed workpiece along the platform and to discontinue the guidance at any time, and
a processing device configured to process the conveyed workpiece while the conveyed workpiece is being guided by the guiding device;
wherein the guiding device comprises at least two guide rails, the at least two guide rails configured to be movable between a first position and a second position; and
wherein, in the first position, the guide rails effect a guiding of the conveyed workpiece along the platform and, in the second position, the guide rails prompt a discontinuation of the guidance.

2. The flow production system of claim 1, further comprising:
a control device configured to detect a fault;
wherein the control device is further configured, in response to the detection of a fault, to prompt the guiding device of the platform to discontinue the guidance.

3. The flow production system of claim 2, wherein the control device is disposed on the platform.

4. The flow production system of claim 1, wherein the platform further comprises:
means for moving the platform, which are configured to move the platform into and out of the flow production system.

5. The flow production system of claim 4, wherein the means for moving comprises at least one of rollers or air cushions.

6. The flow production system of claim 1, wherein the processing device comprises a robotic manipulator.

7. The flow production system of claim 6, wherein the platform further comprises a linear unit for moving the robotic manipulator.

8. The flow production system of claim 1, wherein the processing device is further configured to discontinue the processing of the workpiece in response to a discontinuation of the guidance.

9. The flow production system of claim 1, wherein the platform further comprises at least one of:
means for detecting a conveying velocity of the conveyor; or
means for detecting a position of the workpiece relative to the platform.

10. The flow production system of claim 9, wherein at least one of the means for detecting the velocity of the conveyor or the means for detecting the position of the workpiece are provided on the guiding device.

11. The flow production system of claim 1, wherein guiding of the workpiece occurs by contact of the guide rails with at least one of a part of the conveyor or a part of the workpiece.

12. The flow production system of claim 1, wherein the guide rails comprise at least one of rollers, belts or balls, which, in the first position of the guide rails, are in contact with at least one of a part of the conveyor or a part of the workpiece.

13. The flow production system of claim 12, wherein the guiding device comprises at least one carrier which can be moved at least linearly in a conveying direction of the flow production system.

14. The flow production system of claim 13, wherein the at least one carrier is a mandrel.

15. A method for operating a flow production system as set forth in claim 1, the method comprising:
guiding a conveyed workpiece along the platform with the guiding device;
processing the workpiece with the processing device during guiding; and
discontinuing at least one of the guidance or the processing in response to the detection of a fault.

16. A platform for use in a flow production system of an assembly line or production line, whereby in said flow production system a workpiece is conveyed along a conveying direction, the platform comprising:
a guiding device configured to guide the conveyed workpiece along the platform and to discontinue the guidance at any time; and a processing device configured to process the conveyed workpiece while the conveyed workpiece is being guided by the guiding device;

wherein the platform is configured to be moved into and out of the flow production system substantially as a whole;

wherein the guiding device comprises at least two guide rails, the at least two guide rails configured to be movable between a first position and a second position; and wherein, in the first position, the guide rails effect a guiding of the conveyed workpiece along the platform and, in the second position, the guide rails prompt a discontinuation of the guidance.

17. The platform of claim 16, further comprising means for moving the platform into and out of the flow production system.

18. The platform of claim 17, wherein the means for moving the platform comprise at least one of rollers or air cushions.

19. The platform of claim 16, wherein the processing device comprises a robotic manipulator.

20. The platform of claim 19, further comprising a linear unit for moving the robotic manipulator.

21. The platform of claim 16, wherein the processing device is further configured to discontinue the processing of the workpiece in response to a discontinuation of the guidance.

* * * * *